(12) United States Patent
Tamai et al.

(10) Patent No.: US 11,662,013 B2
(45) Date of Patent: May 30, 2023

(54) STALACTITE PASSIVE LUBRICATION SYSTEM

(71) Applicant: GM Global Technology Operations LLC, Detroit, MI (US)

(72) Inventors: Goro Tamai, Bloomfield Hills, MI (US); Robert P. McCleary, Waterford, MI (US); Marc R. Yarnall, Royal Oak, MI (US); David J. Varda, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 366 days.

(21) Appl. No.: 17/030,885

(22) Filed: Sep. 24, 2020

(65) Prior Publication Data

US 2022/0090673 A1 Mar. 24, 2022

(51) Int. Cl.
| | |
|---|---|
| *F16H 57/04* | (2010.01) |
| *H02K 9/19* | (2006.01) |
| *H02K 1/32* | (2006.01) |
| *H02K 7/00* | (2006.01) |
| *H02K 7/116* | (2006.01) |

(52) U.S. Cl.
CPC ..... *F16H 57/0421* (2013.01); *F16H 57/0426* (2013.01); *F16H 57/0436* (2013.01); *F16H 57/0457* (2013.01); *F16H 57/0465* (2013.01); *F16H 57/0476* (2013.01); *H02K 1/32* (2013.01); *H02K 7/003* (2013.01); *H02K 7/116* (2013.01); *H02K 9/19* (2013.01)

(58) Field of Classification Search
CPC ............. F16H 57/0421; F16H 57/0426; F16H 57/0436; F16H 57/0457; F16H 57/0465; F16H 57/0476; F16H 2200/0021; F16H 57/045; H02K 1/32; H02K 7/003; H02K 7/116; H02K 9/19; B60Y 2200/021
See application file for complete search history.

(56) References Cited

U.S. PATENT DOCUMENTS

| | | | | |
|---|---|---|---|---|
| 2,049,234 | A * | 7/1936 | Thomas | F16H 57/0421 73/199 |
| 3,529,698 | A * | 9/1970 | Nelson | F16H 57/0447 184/6.12 |
| 4,721,184 | A * | 1/1988 | Sowards | F16N 29/04 184/6.12 |
| 8,261,883 | B2 * | 9/2012 | Ariga | F16H 57/0423 474/1 |

(Continued)

*Primary Examiner* — Michael A Riegelman
(74) *Attorney, Agent, or Firm* — Vivacqua Crane PLLC

(57) ABSTRACT

A vehicle stalactite passive lubrication system includes a drive unit having an electric motor and a gear. A sump has a sump extension. A lubricant is collected in the sump for gravity flow into the sump extension. A stalactite member is fixed to the drive unit and is positioned above an element to be filled with a fluid, lubricated or cooled. The stalactite member is directed downwardly toward the sump with the lubricant splashed by gear rotation collected on neighboring walls and the stalactite member and directed downwardly by gravity into the sump or target element. The stalactite member includes: a drip edge oriented at an angle to a horizontal plane; and a tip defining an end of the drip edge. The angle is selected to direct the lubricant to discharge off the stalactite member at the tip as a lubricant stream into the sump or target element.

20 Claims, 7 Drawing Sheets

(56) References Cited

U.S. PATENT DOCUMENTS

| | | | | |
|---|---|---|---|---|
| 8,899,381 | B2* | 12/2014 | Ebihara | F16H 57/0483 |
| | | | | 184/6.12 |
| 10,746,282 | B2* | 8/2020 | Ito | F16H 48/08 |
| 10,859,152 | B2* | 12/2020 | Yu | F16H 57/0475 |
| 2012/0129614 | A1* | 5/2012 | Knoblauch | F16H 57/0427 |
| | | | | 464/7 |
| 2019/0178365 | A1* | 6/2019 | Ishikawa | F16H 57/0478 |
| 2019/0186621 | A1* | 6/2019 | Hagino | F16H 57/02 |
| 2020/0393038 | A1* | 12/2020 | Matsui | F16H 57/0423 |
| 2020/0408297 | A1* | 12/2020 | Ishikawa | F16H 57/0471 |
| 2022/0090673 | A1* | 3/2022 | Tamai | H02K 7/003 |

* cited by examiner

STALACTITE PASSIVE LUBRICATION SYSTEM

INTRODUCTION

The present disclosure relates to electric vehicle drive unit lubrication systems.

Mechanically simple electrified drive-units (DUs) commonly employ splash lubrication systems for cooling and lubrication of the system components. Splash lubrication occurs during rotation of components such as gears through a lubricant bath and is reliant on gravity flow to redirect the splashed lubricant from nearby walls and surfaces. The reliance on gravity flow may make sufficient and metered gear/pinion/bearing lubrication and rotor cooling difficult, particularly over predetermined vehicle speed and temperature ranges.

Insufficient metered flow reliant totally on passive splash lubrication to areas in the DU that can be difficult to feed, depending on the vehicle speed, and fluid temperature may include the following: 1) Upper Reservoir Sump (used to gravity lubrication feed bearings, motor rotor, gears) and gear meshes, and walls/ribs that gravity fed bearing pockets or rods; 2) a planetary gear (PG) pinion lubrication w/splash lubrication; the PG pinion lubrication for higher speed pinions (~10,000 rpm and greater) customarily requires an actively pressurized lubrication circuit. Thus, in a splash-lubrication system, it is difficult to lubricate high-speed pinion bearings; 3) Rotor Cooling: the thermal robustness of rotor magnets may be improved by adding high cost HRE (Heavy Rare-Earth) materials, yet cooling the magnets via fluid flow may be a more cost-effective solution. In known rotor cooling systems, though, the rotor flow is external to the rotor (end-rings) or often uses a pressurized lubrication system.

Thus, while current splash lubrication systems for cooling and lubricating the system components achieve their intended purpose, there is a need for a new and improved system and method for gravity lubricating electric vehicle drive units.

SUMMARY

According to several aspects, a stalactite passive lubrication system is provided for an electrified drive unit (DU) of an electric vehicle having an electric motor and a gear. A lubricant is collected in a sump. A stalactite member is fixed to the DU and is positioned above an element that needs to be filled with a fluid, lubricated or cooled. The stalactite member is directed downwardly toward the sump such that the lubricant splashed as droplets by rotation of the gear is collected on the stalactite member and is directed by the stalactite member downwardly by gravity into the sump.

In another aspect of the present disclosure, a sump extension is connected to the sump, wherein the lubricant flows by gravity flow out of the sump into the sump extension.

In another aspect of the present disclosure, the sump extension is positioned axially along an axis of the electric motor.

In another aspect of the present disclosure, a flow passage is connected to the sump extension. A gear input shaft is included wherein the lubricant flows by gravity from the sump extension downwardly via the flow passage into the gear input shaft feeding the lubricant to the gear.

In another aspect of the present disclosure, the gear input shaft includes a gear input shaft passage. A mechanical pump (mPump) is connected to deliver pressurized lubricant flow into the gear input shaft passage of the gear input shaft to deliver pressurized lubricant flow to the gear.

In another aspect of the present disclosure, a check valve positioned in the flow passage permits gravity flow of the lubricant in a downward direction in the flow passage and prevents pressurized back flow of the lubricant when the mPump is operating.

In another aspect of the present disclosure, a flow passage is connected to the sump extension. A second flow passage is connected to the sump extension. The lubricant flows by gravity into the flow passage and into the second flow passage and further into a rotor shaft from a first end and by an oppositely positioned second end of the rotor shaft.

In another aspect of the present disclosure, the electric motor includes a rotor, a stator and multiple magnets cooled by gravity flow of the lubricant.

In another aspect of the present disclosure, the stalactite member includes a drip edge oriented at an optimum angle with respect to a horizontal plane. A tip defines an end of the drip edge. The optimum angle is selected to direct the lubricant to discharge off the stalactite member at the tip as a lubricant stream directed into the sump.

In another aspect of the present disclosure, the optimum angle is greater than approximately 50 degrees down from a horizontal plane.

In another aspect of the present disclosure, a partial vacuum generated proximate to the gear acting to draw the lubricant away from the stalactite member is overcome by the stalactite member including a skew angle defined with respect to a vertical plane up to approximately 45 degrees at air flows generating the partial vacuum off the gear at any gear rotational speed.

According to several aspects, a stalactite passive lubrication system of a vehicle includes an electrified drive unit (DU) having an electric motor and a gear. A sump has a sump extension connected to the sump. A lubricant is collected in the sump for gravity flow out of the sump into the sump extension. A stalactite member is fixed to the DU and is positioned proximate to the gear. The stalactite member is directed downwardly toward the sump such that the lubricant splashed as droplets by rotation of the gear is collected on the stalactite member and directed by the stalactite member downwardly by gravity into the sump. The stalactite member includes: a drip edge oriented at an angle with respect to a horizontal plane; and a tip defining an end of the drip edge, the angle selected to direct the lubricant to discharge off the stalactite member at the tip as a lubricant stream directed into the sump.

In another aspect of the present disclosure, the electric motor includes a rotor, a stator and multiple magnets, with the electric motor partially cooled by gravity flow of the lubricant out of apertures created in the sump extension.

In another aspect of the present disclosure, a shaft of the rotor has a flow passage connected to the sump extension. The lubricant flows by gravity from the sump extension downwardly into the flow passage feeding the lubricant to the rotor.

In another aspect of the present disclosure, an inlet tube is connected to the sump extension and feeds the lubricant to the shaft.

In another aspect of the present disclosure, a coupling having a diameter larger than a diameter of the inlet tube feeds the lubricant to the shaft. The coupling is connected to the shaft with a pressed seal, with the coupling enabling increased lubricant flow into the shaft.

In another aspect of the present disclosure, the stalactite member defines a polymeric material with the stalactite member connected to the DU.

According to several aspects, a method for passively lubricating an electrified drive unit (DU) of a vehicle having an electric motor and a gear comprises: connecting a sump extension to a sump; collecting a lubricant in the sump for gravity flow out of the sump into the sump extension; fixing a stalactite member to the DU with the stalactite member positioned proximate to the gear; directing the stalactite member downwardly toward the sump such that the lubricant splashed as droplets by rotation of the gear is collected on the stalactite member; orienting a drip edge of the stalactite member at an angle with respect to a horizontal plane; and providing a tip defining an end of the drip edge, with the angle selected to direct the lubricant to discharge off the stalactite member at the tip as a lubricant stream into the sump, into a gear mesh or onto a case wall thereafter feeding a bearing pocket.

In another aspect of the present disclosure, the method further includes partially cooling a rotor, a stator and multiple magnets of the electric motor by directing a gravity induced flow of the lubricant out of apertures created in the sump extension onto the electric motor.

In another aspect of the present disclosure, the method further includes: connecting a flow passage to the sump extension; providing a gear input shaft connected to the gear; and feeding the lubricant to the gear by gravity flow of the lubricant from the sump extension downwardly via the flow passage into the gear input shaft.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1B:
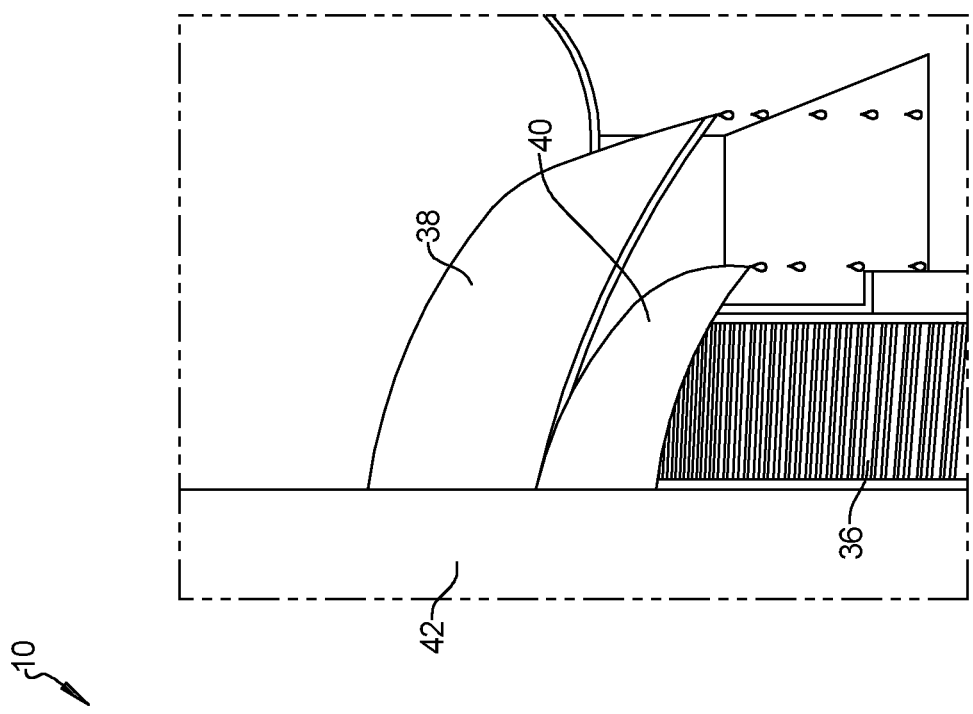
FIG. 1B is a side elevational view of a stalactite member of the system of FIG. 1.
Figure 1A:
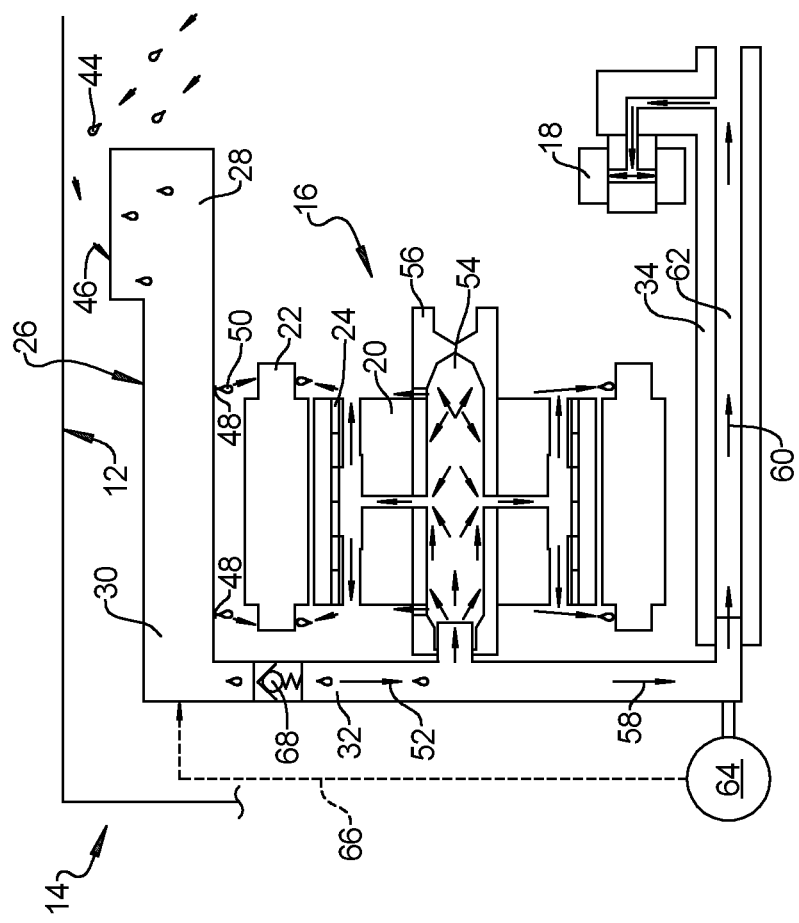
FIG. 1A is a diagrammatic presentation of a stalactite passive lubrication system of a vehicle according to an exemplary aspect.

Referring to FIG. 1, a stalactite passive lubrication system 10 of a vehicle provides lubrication to an electrified drive unit (DU) 12 incorporated for example within an electric vehicle 14. According to several aspects components of the DU 12 include but are not limited to an electric motor 16 and one or more drive gears 18, pinions and the like. The electric motor 16 may include a rotor 20, a stator 22 and multiple magnets 24. Lubrication and cooling for the components of the DU 12 is provided from a lubrication sump 26 which collects lubricant in an upper sump 28 as will be described below. Lubricant flows by gravity flow out of the upper sump 28 into a sump extension 30 which may be positioned axially along an axis of the electric motor 16. From the sump extension 30 lubricant flows downwardly via a flow passage 32 into a gear input shaft 34 which feeds the lubricant to the drive gears 18.

According to several aspects, the lubricant is initially collected for distribution into the upper sump 28 by capturing lubricant splashed upward off a rotating component such as a differential ring gear 36 using one or more stalactite members, including a first stalactite member 38 and a second stalactite member 40. According to several aspects the stalactite members may be a polymeric material or a metal and fixed, connected for example by fasteners to a structural member 42 of the DU 12, or provided as a cast member. Lubricant splashed as droplets 44 and collected onto the stalactite members such as the first stalactite member 38 and the second stalactite member 40 are directed downwardly in a flow direction 46 by the configuration of the stalactite members into the upper sump 28. The stalactite members are themselves directed downward away from their connection locations with the structural member 42 toward the rotating component such as the differential ring gear 36.

Gravity flow of the lubricant out of the upper sump 28 is provided by multiple apertures 48 created in the sump extension 30 to drip flow as droplets 50 onto an upper portion of the stator 22. Gravity flow of the lubricant is also provided out of the sump extension 30 and through the flow passage 32 in a downward direction 52 providing a portion of the lubricant flow into a shaft bore 54 of a rotor shaft 56 of the rotor 20. From the shaft bore 54 lubricant may flow outward to lubricate other features of the electric motor 16 including the rotor 20, the stator 22 and the multiple magnets 24. An additional portion of the lubricant is gravity fed through the flow passage 32 and directed in a downward flow path 58 providing a portion of the lubricant flow in a flow direction 60 via a gear input shaft passage 62 of the gear input shaft 34 toward the one or more drive gears 18.

If pressurized flow of the lubricant is necessary, an engine-driven mechanical pump (mPump) 64 may be connected to deliver pressurized lubricant flow for example in the flow direction 60 via the gear input shaft passage 62 of the gear input shaft 34 to deliver pressurized lubricant flow to the one or more drive gears 18. A metered bypass flow line 66 (shown in phantom) may also be provided as a parallel path to the upper sump 28, providing a separate line to fill a cooler circuit, a motor cooling port, or other gears or bearings (not shown). To mitigate against back-flow of the lubricant through the flow passage 32 back into the upper sump 28, a check valve 68 may be positioned in the flow passage 32, which permits gravity flow of the lubricant in the downward direction 52 but blocks pressurized back flow of the lubricant when the mPump 64 is operating.

Referring to FIG. 2 and again to FIG. 1, a lubricant system 70 provides an exemplary overview of the components provided with lubricant flow. According to several aspects an orifice 72 may be positioned between the engine-driven mechanical pump (mPump) 64, the rotor shaft 56 and the gear input shaft 34. The orifice 72 enables multiple lubricant holes 74 provided in the rotor shaft 56 to be increased in size (diameter) or quantity to achieve passive gravity-feed flow, while preventing the mPump 64 from overfeeding the rotor shaft 56 during an active pressurized engine-on operation.

Referring to FIG. 3 and again to FIG. 1, to increase lubricant flow to the rotor shaft 56, the lubrication sump 26 shown in FIG. 1 is modified to create a modified lubrication sump 76 which provides the flow passage 32 and a second flow passage 78. Using the flow passage 32 and the second flow passage 78 lubricant flow can enter the rotor shaft 56 from a first end 80 and by an oppositely positioned second end 82. The combination of the flow passage 32 and the second flow passage 78 increases lubricant flow rate to the rotor 20, the stator 22, the multiple magnets 24 and to the stator end-windings. The two feeds provided by the flow passage 32 and the second flow passage 78 from the upper sump 28 may also be routed individually to the rotor shaft 56 and to a separate shaft (not shown) with a planetary gear shaft. According to further aspects, a limiter valve 84 may be incorporated in the second flow passage 78 to limit rotor lubricant flow for low temperature system operation. The limiter valve 84 is open providing maximum lubricant flow for hot or normal temperature conditions. According to several aspects, the limiter valve 84 may be a bi-metallic valve, a T-stat wax valve, or a solenoid with multiple comparison procedures modelling (MCP) rotor/stator temperatures used as inputs to direct valve open and close.

Figure 3:
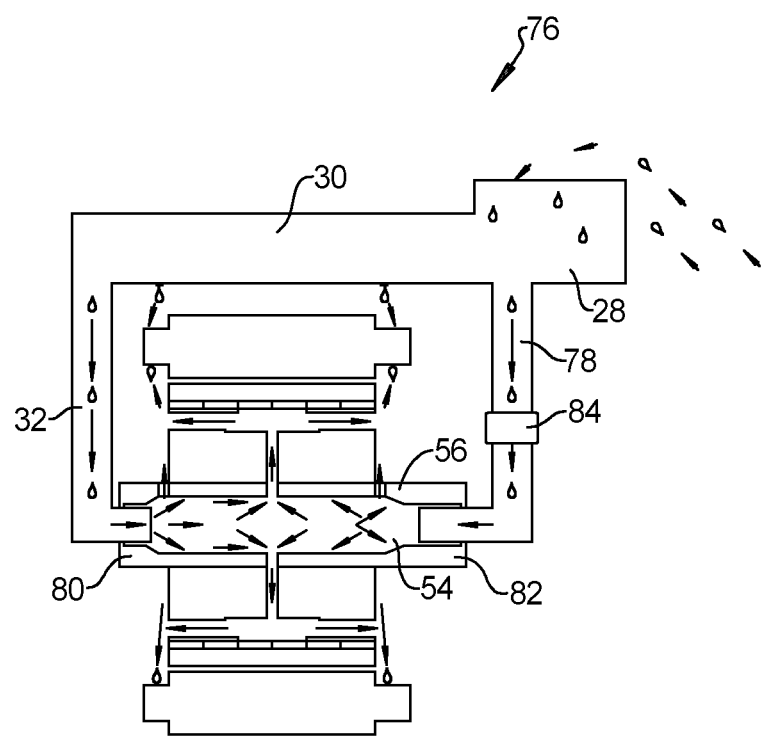
FIG. 3 is a side elevational view modified from the system of FIG. 1 to provide lubrication flow to opposing ends of a shaft.
Figure 4:
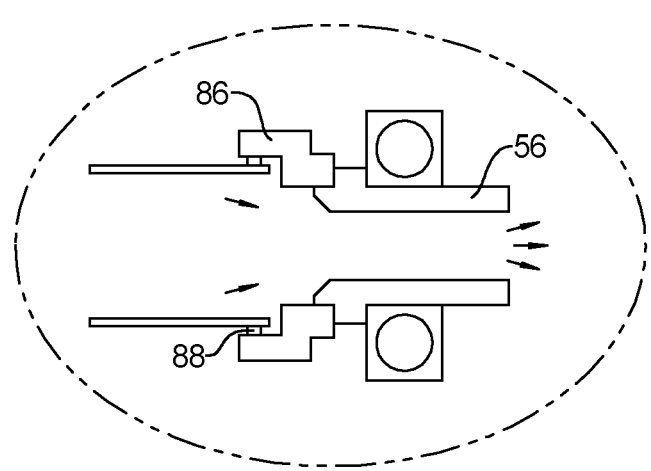
FIG. 4 is a side elevational view of area 4 of FIG. 3 showing an alternate coupling connection.

Referring to FIG. 4 and again to FIG. 3, to enable further increased flow INTO the rotor shaft 56 and to ensure the flow passage 32 is not the main flow restriction, a larger diameter coupling 86 with a seal 88 are pressed onto the rotor shaft 56. Optionally, a tight orifice/annulus dam (not shown) may be positioned onto the rotor shaft 56.

Figure 2:
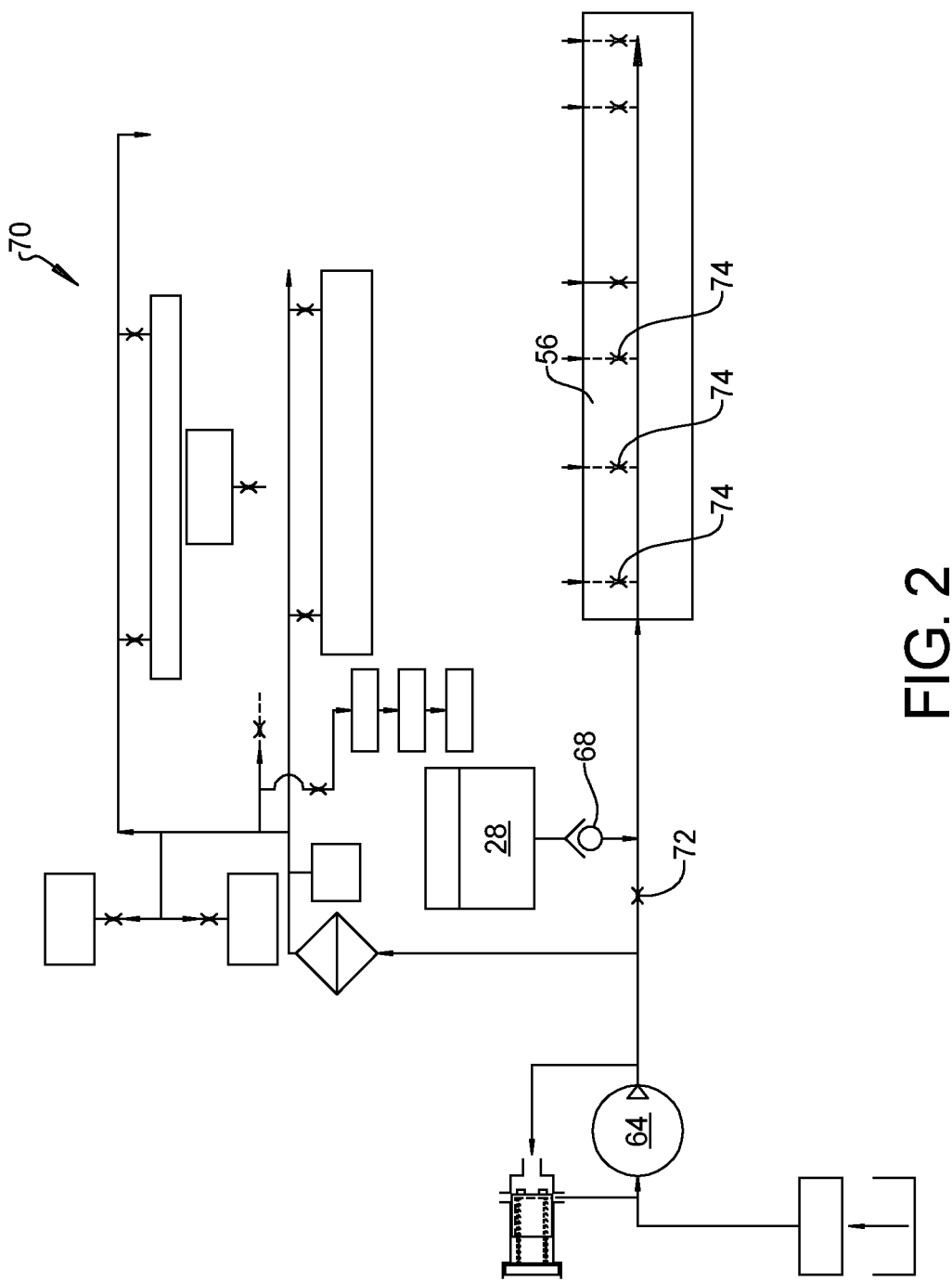
FIG. 2 is a lubrication system diagram of the system of FIG. 1.

Referring to FIG. 5 and again to FIGS. 2 and 3, a splash lubrication system typically sources its fluid from a transaxle/drive-unit main-case sump, and this fluid is pumped up by the rotating differential ring gear 36 (shown in reference to FIG. 1) which dips into a lubricant lower sump. At lower vehicle speeds, fluid is not pumped up towards the upper regions of the transmission case where the upper sump 28 can be located. Depending on where the upper sump 28 is positioned inside the DU 12, the vehicle speed at which a pumping effect is present may be higher than for the lubrication system. At lower vehicle speeds, the differential ring gear 36 is rotating too slowly to directly splash feed the upper sump 28, however a transfer gear 90 and a transfer gear 92 proximate to the differential ring gear 36 are operating at several times the rpm of the differential ring gear 36. Therefore, lubricant fluid is being splattered to various surfaces by the transfer gears 90, 92. A stalactite member 94 and an additional stalactite member 96 may be positioned proximate to (i.e., in a position able to collect splattered flow from) the differential ring gear 36 to collect the splattered flow from the transfer gear 92, and precisely drip the lubricant in a fluid stream 98 from a lower edge 100 of the stalactite member 94 and/or the additional stalactite member 96 to a target sump 102, a mesh, or the like.

Figure 8:
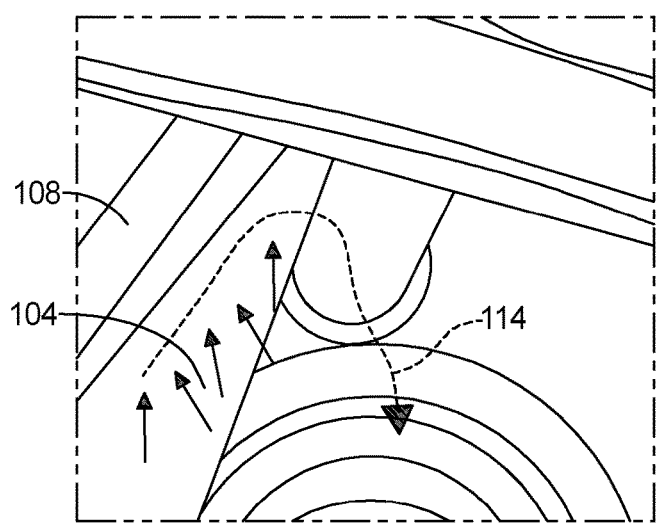
FIG. 8 is a side elevational view of the electrified drive unit of FIG. 6.

Referring to FIGS. 6, 7 and 8 and again to FIGS. 1 through 5, according to further aspects, a stalactite member 104 may be built into an existing boss 106 and positioned for example proximate to a faring 108 and a rib 110. A shape of the stalactite member 104 as well as the faring 108 may be predetermined based on a balance of structural and lubricant flow requirements.

Figures 6, 7:
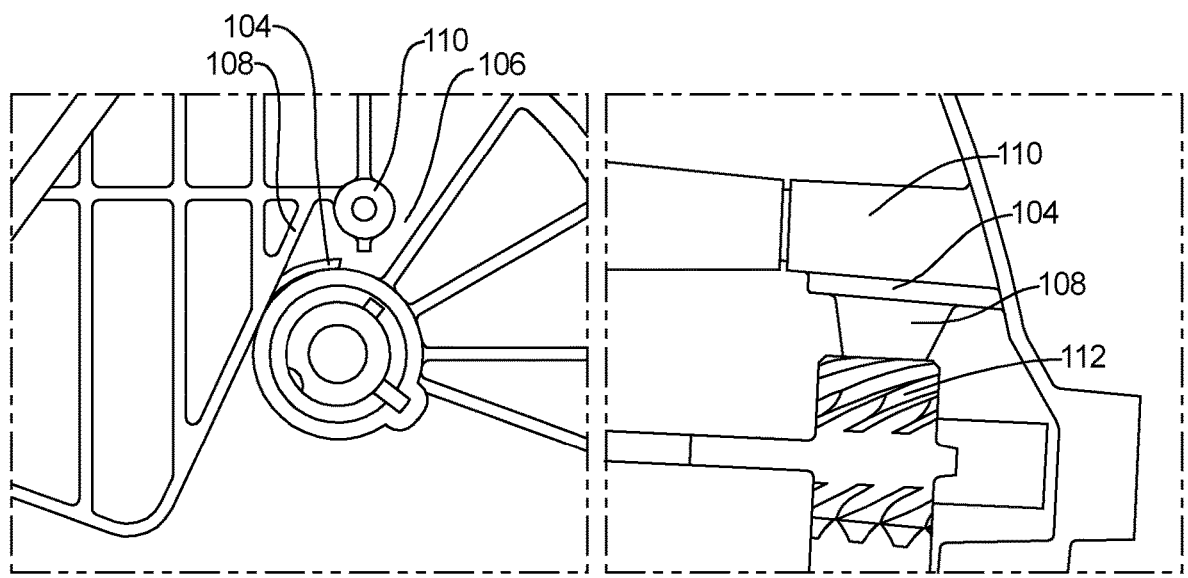
FIG. 6 is an end elevational view of a wall portion of an electrified drive unit incorporating a stalactite member of the present disclosure.
FIG. 7 is an end elevational view of the electrified drive unit of FIG. 6.

Referring more specifically to FIG. 7 and again to FIG. 6, the stalactite member 104 may be oriented and positioned to collect lubricant splashed from one or more neighboring gears and drip or flow the lubricant onto a rotating pinion gear 112.

Referring more specifically to FIG. 8 and again to FIGS. 6 through 7, lubricant splatter collected by the stalactite member 104 may be directed by the faring 108 to drip or flow into a mesh 114 and preferably into a "closing" mesh, and off-center across a gear face-width to let the gear helix pump the fluid across a facewidth of the gear.

Referring to FIG. 9 and again to FIGS. 1 through 8, an exemplary stalactite member 116 is presented. A drip edge 118 from which lubricant is intended to collect for directed deposition such as into an upper sump is oriented at an angle alpha (α) with respect to a horizontal plane 120. Lubricant collected on a surface of the stalactite member 116 drips off at or proximate to a tip 122 which is directed into a collection area such as the upper sump 28 previously described herein. In the exemplary condition shown, angle α is less than an angle which forces lubricant collected on the stalactite member 116 to drip off at or proximate to the tip 122 of the stalactite member 116, therefore as shown a lubricant stream 126 is dripping off at an interim position 128 which may not collect at the designated location or sump. Testing has therefore been conducted of various materials, edge designs and edge angles to determine an optimum angle beta (β) of the drip edge 118 defining a "minimum" beta angle to ensure a proper drip-off-tip behavior which directs the lubricant to discharge off the stalactite member 116 at the tip 122.

Figure 9:
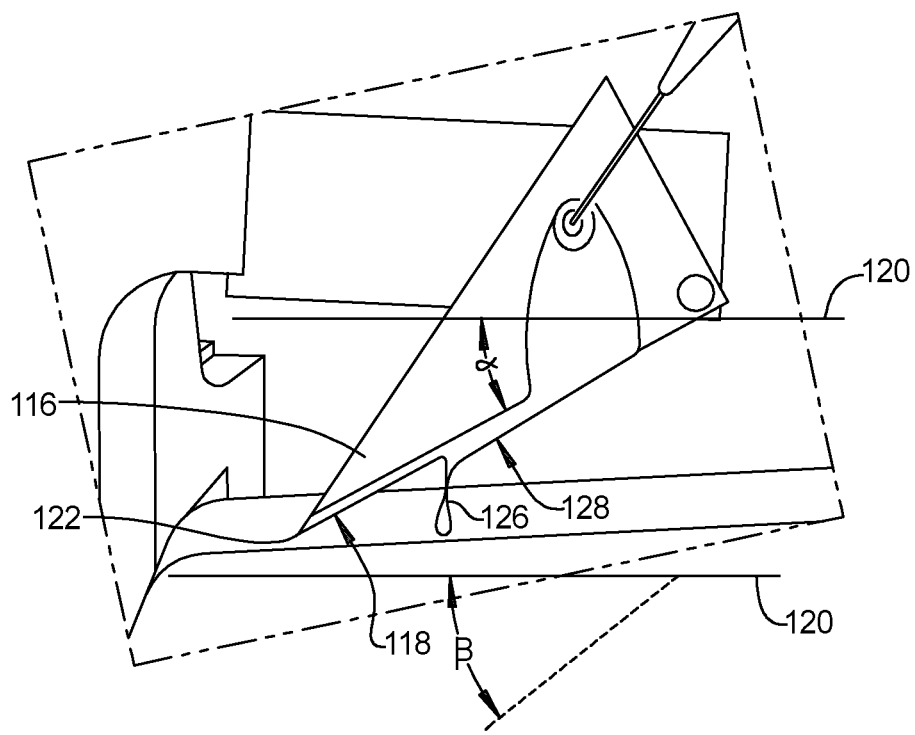
FIG. 9 is an end elevational view of a range of angles to determine a minimum drip angle for a stalactite member of the present disclosure.
Figure 10:
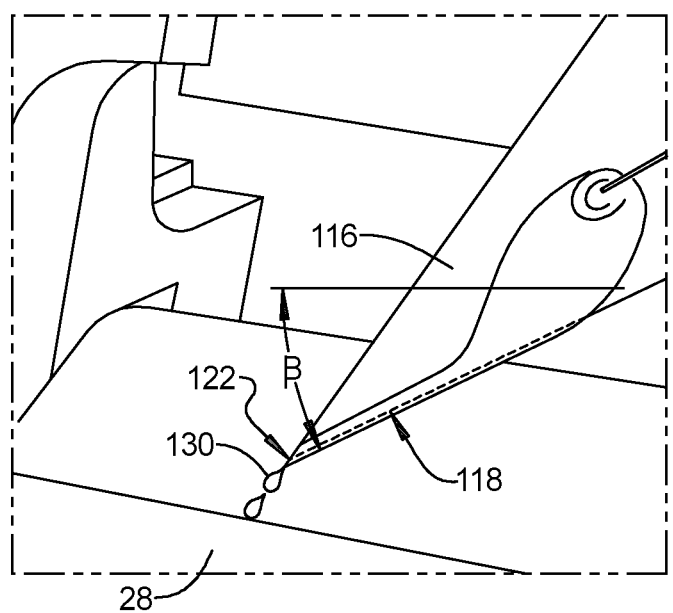
FIG. 10 is an end elevational view of area 10 of FIG. 9.

Referring to FIG. 10 and again to FIG. 9, the optimum angle beta (1) of the drip edge 118 is applied which directs the lubricant to discharge off the stalactite member 116 at the tip 122 as a lubricant stream 130 where it is directed for example into the upper sump 28. According to several aspects the desired angle is always greater than approximately 50 degrees down from a horizontal plane.

Figure 5:
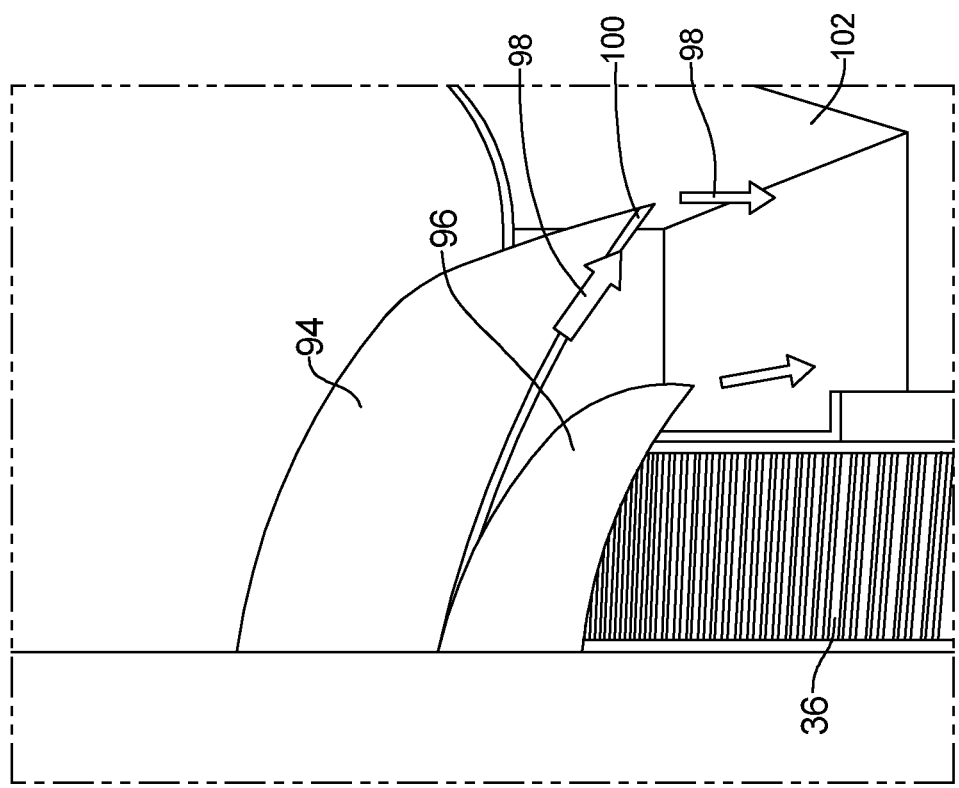
FIG. 5 is a side elevational view of a stalactite member of the system of FIG. 1 directed into a sump.
Figure 5:
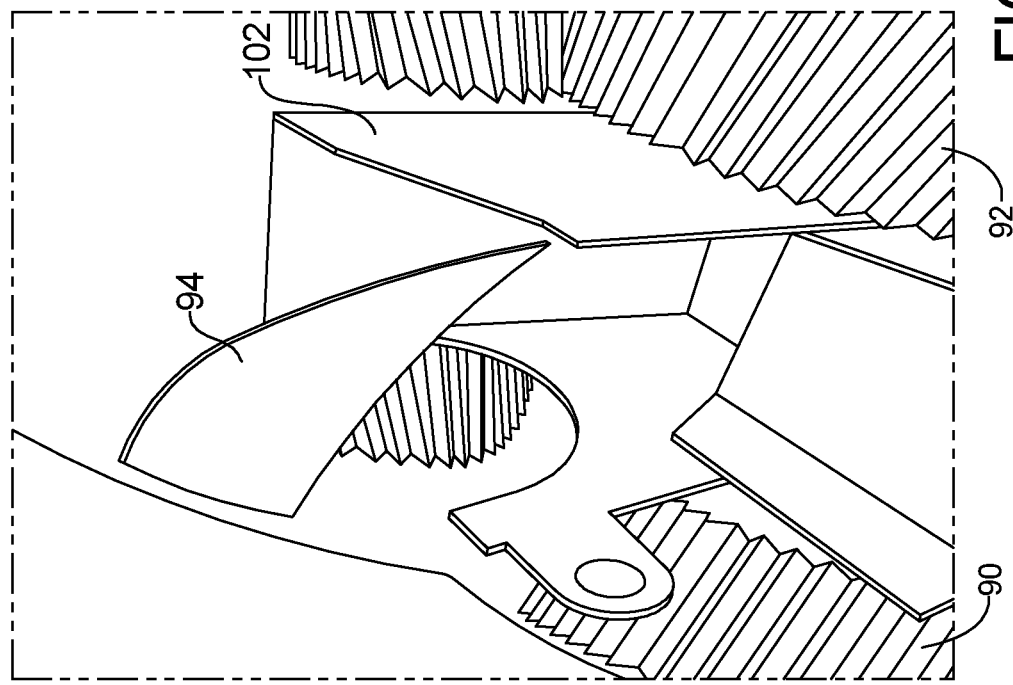
Figure 11:
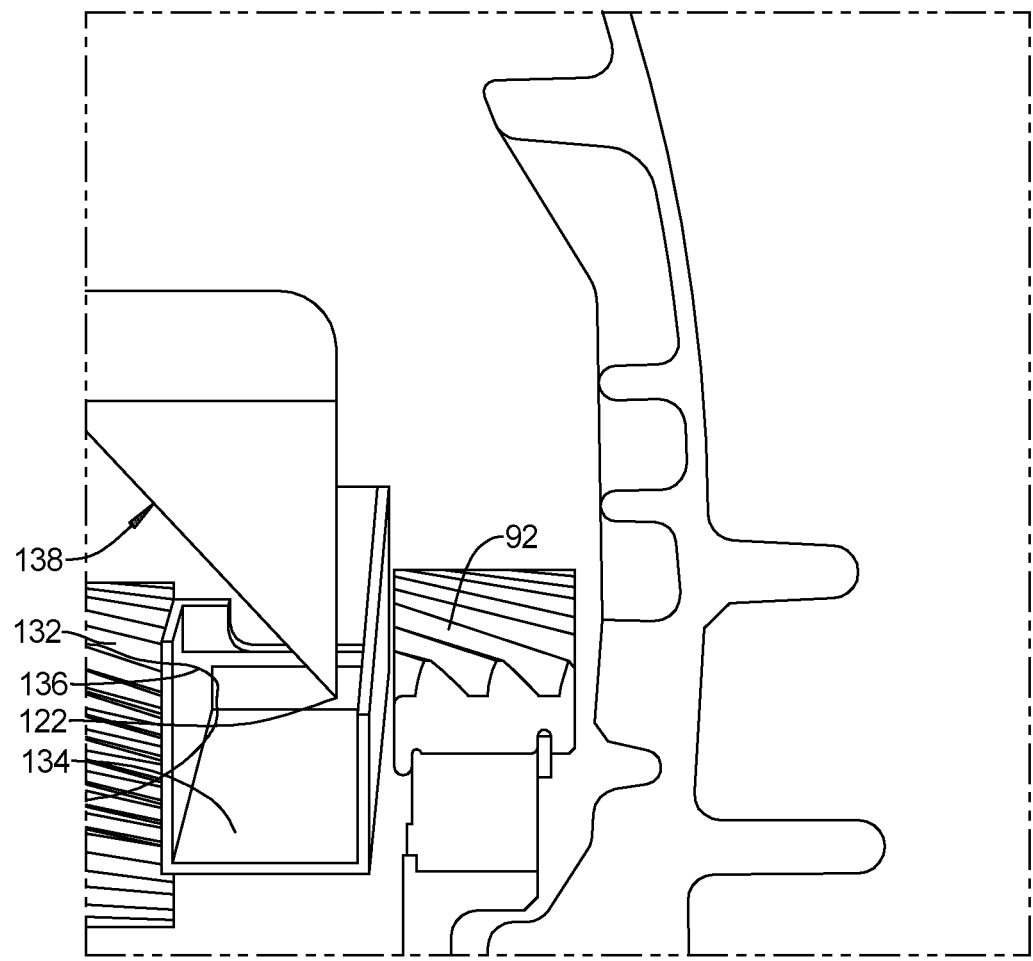
FIG. 11 is an end elevational view of the electrified drive unit of FIG. 6.

Referring to FIG. 11 and again to FIG. 5, a gear 132 may be positioned proximate to a desired location of lubricant collection such as a reservoir or a sump 134. As the air flow reaches high velocity during high gear rotational speeds, such as a velocity at or above approximately 60 mph, a partial vacuum 136 may be generated proximate to the area of the gear 132. The partial vacuum 136 may draw the lubricant away from the intended collection or splash location, such as into the sump 134 or onto a nearby wall. It has been found that lubricant may be accurately deflected from a tip of the stalactite member of the present disclosure at a skew angle 138 of the stalactite member defined with respect to a vertical plane up to approximately 45 degrees at air flows generating the partial vacuum 136 at any gear rotational speed including up to approximately 80 mph. Provision of the skew angle 138 therefore allows the stalactite member to continue to direct lubricant flow from the tip 122 of the stalactite member to the desired location such as into the sump 134 under conditions including the presence of the partial vacuum 136.

The stalactite passive lubrication system 10 introduces stalactite-like members or appendages on interior surfaces of the DU that collect scattered splash fluid such as lubricant from walls and from spinning gear members, and directs this fluid as a precise lubrication flow stream to locations not targetable via traditional splash lubrication systems such as but not limited to a differential ring gear pumping with or without a baffle, and also at a wide range of speeds and fluid temperatures.

The stalactite features can be dedicated appendages or be built into an existing boss via faring and ribbing designs. The shape of the faring is a balance of structural and flow requirements. To be robust to the partial vacuum effect generated by neighboring gears, the stalactite geometry and position are designed such that the appendage tip vs. the upper sump wall tub geometry traps up to approximately 45 degree flow skew.

Stalactite design geometry includes a straight appendage lower edge where splash is captured. According to several aspects, the straight appendage edge is oriented at greater than approximately 50 degrees from horizontal.

The lubrication system of the present disclosure provides metered rotor cooling and pinion lubrication feeds in a passive splash lubricated DU system. In the present system, the lubrication feed is accomplished passively, by gravity feed. In addition, in the present system the lubrication feed is distributed in a metered fashion, without introducing additional shear surfaces. Additionally, the system can have one or two inlet tubes where one tube can be controlled as a function of temperature and/or power. The two feeds for example from the upper sump may be routed individually to the rotor shaft and to a separate shaft with the PG gear shaft.

Also, for a hybrid electric vehicle (HEV) drive system with a mechanical pump (mPump) such as an engine driven or electrically operated pump, the present system can be implemented with a check valve to isolate an upper sump from the mPump. This mitigates against pressurized flow resulting from pump operation from overwhelming the flow normally achieved by gravity assisted flow. An electrical vehicle (EV) EngineOn flow-balancing orifice may also be implemented between the engine-driven mechanical pump (mPump) and the input shaft. This enables the lubrication holes in the input shaft to be increased to achieve passive gravity-feed flow, while preventing the mPump from overfeeding the input shaft during active pressurized engine-on operation.

Similarly, in a splash-lubricated drive unit (DU), the high-speed PG pinions can be fed by metered flow internally from the main PG shaft. Also, to enable increased flow INTO a shaft, which ensures the inlet tube is not a main restriction to flow, a larger diameter coupling with a seal pressed, or having a tight orifice/annulus dam on to the shaft may be implemented.

A stalactite passive lubrication system 10 of the present disclosure offers several advantages. These include a lubrication system delivering a metered amount of fluid drained from an upper-sump filled by splash-pumping, without introducing additional shear surfaces, and without an actively pressurized lubrication system (e.g., a pump). An effective way of cooling the rotor is to flow oil through the rotor close to the magnets, as the magnet temperature is often the thermal constraint of the motor system. Similarly, the mechanism can feed the planetary gear (PG) main shaft to provide lubrication to the pinion system.

The present system provides a method for filling an upper-sump, required due to insufficient splash-feed from the differential ring gear when the speed and/or temperature are low, and when the lubrication flow is not being targeted precisely enough at an upper-sump or a gear/bearing. The present lubrication system overcomes this limitation by utilizing a single or an array of "stalactite" appendages which capture the adhered splash fluid over a large area, for example lubricant sprayed by faster spinning transfer gears, pinions, etc.), and by the geometry/shape of the stalactite appendage(s). The collected fluid is then drip-streamed precisely to designated areas such as to gear meshes, walls/ribs that feed bearing pockets, electric motor features, and to fill upper sumps. Additionally, the present system may include two inlet tubes where one tube can be controlled as a function of temperature and power. Also, for an HEV with a mechanical pump (mPump), the present system may be implemented with a check valve to isolate an upper sump from the mPump. Similarly, in a splash-lubricated DU, the high-speed PG pinions may be fed by a metered flow internally from the main PG shaft.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A stalactite passive lubrication system of a vehicle, comprising:
    an electrified drive unit;
    an electric motor and a gear;
    a sump collecting a lubricant; and
    a stalactite member fixed to the electrified drive unit and positioned above an element to be filled with a fluid, lubricated or cooled, the stalactite member directed downwardly toward the sump with the lubricant splashed as droplets by rotation of the gear collected on the stalactite member and directed by the stalactite member downwardly by gravity into the sump;
    wherein a partial vacuum generated proximate to the gear acting to draw the lubricant away from the stalactite member is overcome by the stalactite member including a skew angle defined with respect to a vertical plane up to 45 degrees at air flows generating the partial vacuum off the gear at any gear rotational speed.

2. The stalactite passive lubrication system of the vehicle of claim 1, further including a sump extension connected to the sump, wherein the lubricant flows by gravity flow out of the sump into the sump extension.

3. The stalactite passive lubrication system of the vehicle of claim 2, wherein the sump extension is positioned axially along an axis of the electric motor and includes multiple apertures for delivery of gravity drip flow of the lubricant out of the sump extension onto the electric motor.

4. The stalactite passive lubrication system of the vehicle of claim 2, further including:
    a flow passage connected to the sump extension; and
    a gear input shaft; and
    wherein the lubricant flows by gravity from the sump extension downwardly via the flow passage into the gear input shaft feeding the lubricant to the gear.

5. The stalactite passive lubrication system of the vehicle of claim 4, further including:
    a gear input shaft passage of the gear input shaft; and
    a mechanical pump (mPump) connected to deliver pressurized lubricant flow into the gear input shaft passage of the gear input shaft to deliver pressurized lubricant flow to the gear.

6. The stalactite passive lubrication system of the vehicle of claim 5, further including a check valve positioned in the flow passage permitting gravity flow of the lubricant in a downward direction in the flow passage and blocking pressurized back flow of the lubricant when the mechanical pump is operating.

7. The stalactite passive lubrication system of the vehicle of claim 2, further including:
a flow passage connected to the sump extension; and
a second flow passage connected to the sump extension; and
wherein the lubricant gravity flows into the flow passage and into the second flow passage and further into a rotor shaft from a first end and by an oppositely positioned second end of the rotor shaft.

8. The stalactite passive lubrication system of the vehicle of claim 1, wherein the electric motor includes a rotor, a stator and multiple magnets cooled by gravity flow of the lubricant.

9. The stalactite passive lubrication system of the vehicle of claim 1, wherein the stalactite member includes:
a drip edge oriented at an optimum angle with respect to a horizontal plane; and
a tip defining an end of the drip edge, the optimum angle selected to direct the lubricant to discharge off the stalactite member at the tip as a lubricant stream directed into the sump.

10. The stalactite passive lubrication system of the vehicle of claim 9, wherein the optimum angle is greater than 50 degrees down from a horizontal plane.

11. A stalactite passive lubrication system of a vehicle, comprising:
an electrified drive unit including an electric motor and a gear;
a sump having a sump extension connected to the sump, wherein a lubricant is collected in the sump for gravity flow out of the sump into the sump extension; and
a stalactite member fixed to the electrified drive unit and positioned proximate to the gear, the stalactite member directed downwardly toward the sump with the lubricant splashed as droplets by rotation of the gear collected on the stalactite member and directed by the stalactite member downwardly by gravity into the sump, the stalactite member including:
a drip edge oriented at an angle with respect to a horizontal plane;
a tip defining an end of the drip edge, the angle selected to direct the lubricant to discharge off the stalactite member at the tip as a lubricant stream directed into the sump, wherein the electric motor includes a rotor, a stator and multiple magnets, with the electric motor partially cooled by gravity flow of the lubricant out of apertures created in the sump extension, wherein the rotor includes a shaft, the shaft having a flow passage connected to the sump extension, wherein the lubricant gravity flows from the sump extension downwardly into the flow passage feeding the lubricant to the rotor;
an inlet tube connected to the sump extension and feeding the lubricant to the shaft; and
a coupling having a coupling diameter larger than a diameter of the inlet tube feeding the lubricant to the shaft, the coupling connected to the shaft with a pressed seal, the coupling enabling increased lubricant flow into the shaft.

12. The stalactite passive lubrication system of the vehicle of claim 11, wherein the stalactite member defines a polymeric material with the stalactite member connected to the electrified drive unit.

13. The stalactite passive lubrication system of the vehicle of claim 11, wherein the angle is greater than 50 degrees down from a horizontal plane.

14. The stalactite passive lubrication system of the vehicle of claim 11, wherein a partial vacuum generated proximate to the gear acting to draw the lubricant away from the stalactite member is overcome by the stalactite member.

15. The stalactite passive lubrication system of the vehicle of claim 14, including a skew angle defined with respect to a vertical plane at air flows generating the partial vacuum off the gear at any gear rotational speed.

16. The stalactite passive lubrication system of the vehicle of claim 15, wherein the skew angle is up to 45 degrees.

17. The stalactite passive lubrication system of the vehicle of claim 11, further including a mechanical pump connected to deliver pressurized lubricant flow into a gear input shaft passage of a gear input shaft to deliver pressurized lubricant flow to the gear.

18. A method for passively lubricating an electrified drive unit of a vehicle having an electric motor and a gear, the method comprising:
connecting a sump extension to a sump;
collecting a lubricant in the sump for gravity flow out of the sump into the sump extension;
fixing a stalactite member to the electrified drive unit with the stalactite member positioned proximate to the gear;
directing the stalactite member downwardly toward the sump such that the lubricant splashed as droplets by rotation of the gear is collected on the stalactite member;
orienting a drip edge of the stalactite member at an angle with respect to a horizontal plane;
providing a tip defining an end of the drip edge, with the angle selected to direct the lubricant to discharge off the stalactite member at the tip as a lubricant stream into the sump; and
creating a partial vacuum generated proximate to the gear acting to draw the lubricant away from the stalactite member is overcome by the stalactite member including a skew angle defined with respect to a vertical plane up to 45 degrees at air flows generating the partial vacuum off the gear at any gear rotational speed.

19. The method of claim 18, further including partially cooling a rotor, a stator and multiple magnets of the electric motor by directing a gravity induced flow of the lubricant out of apertures created in the sump extension onto the electric motor.

20. The method of claim 18, further including:
connecting a flow passage to the sump extension;
providing a gear input shaft connected to the gear; and
feeding the lubricant to the gear by gravity flow of the lubricant from the sump extension downwardly via the flow passage into the gear input shaft.

* * * * *